(12) United States Patent
Koubaa et al.

(10) Patent No.: US 11,334,065 B2
(45) Date of Patent: May 17, 2022

(54) SYSTEM, APPARATUS, AND METHOD FOR CONTROLLING UNMANNED AERIAL VEHICLES FOR SEARCH AND RESCUE

(71) Applicant: Prince Sultan University, Riyadh (SA)

(72) Inventors: Anis Koubaa, Riyadh (SA); Ebtehal Turki Alotaibi, Riyadh (SA); Shahad Saleh Alqefari, Riyadh (SA)

(73) Assignee: Prince Sultan University, Riyadh (SA)

( * ) Notice: Subject to any disclaimer, the term of this patent is extended or adjusted under 35 U.S.C. 154(b) by 289 days.

(21) Appl. No.: 16/740,042

(22) Filed: Jan. 10, 2020

(65) Prior Publication Data

US 2021/0216069 A1    Jul. 15, 2021

(51) Int. Cl.
*G05D 1/00* (2006.01)
*H04L 67/10* (2022.01)
(Continued)

(52) U.S. Cl.
CPC ......... *G05D 1/0027* (2013.01); *B64C 39/024* (2013.01); *G05D 1/104* (2013.01); *H04L 67/10* (2013.01); *H04W 4/90* (2018.02); *B64C 2201/027* (2013.01); *B64C 2201/126* (2013.01); *B64C 2201/143* (2013.01)

(58) Field of Classification Search
USPC ............................ 701/20, 3, 50, 101; 340/902
See application file for complete search history.

(56) References Cited

U.S. PATENT DOCUMENTS

| | | |
|---|---|---|
| 5,832,187 A | 11/1998 | Pedersen et al. |
| 10,203,701 B2 | 2/2019 | Kurdi et al. |

(Continued)

FOREIGN PATENT DOCUMENTS

CN    107943067 A    4/2018

OTHER PUBLICATIONS

Sujit, P. B., & Ghose, D. (2004). Search using multiple UAVs with flight time constraints. IEEE Transactions on Aerospace and Electronic Systems, 40(2), 491-509. doi:10.1109/taes.2004.1310000 (Year: 2004).*

(Continued)

*Primary Examiner* — Elaine Gort
*Assistant Examiner* — Ellis B. Ramirez
(74) *Attorney, Agent, or Firm* — Oblon, McClelland, Maier & Neustadt, L.L.P.

(57) ABSTRACT

A system, method, and non-transitory computer-readable storage medium to perform a search and rescue mission according to a Layered Search and Rescue (LSAR) methodology using a plurality of Unmanned Aerial Vehicles (UAVs) communicatively connected to a remote server. The LSAR methodology can involve receiving data corresponding to a center of an area corresponding to an adverse/ disaster event potentially having survivors at unknown locations; dividing the area into a set of numbered box-shaped layers within the area; calculating a thickness of the box-shaped layers based on a total number of the Unmanned Aerial Vehicles; exclusively assigning one or more of the Unmanned Aerial Vehicles to each box-shaped layer; and controlling the Unmanned Aerial Vehicles to perform the search and rescue mission by selectively switching one or more of the Unmanned Aerial Vehicles between a searcher mode and a rescuer mode.

20 Claims, 10 Drawing Sheets

(51) Int. Cl.
    *H04W 4/90*     (2018.01)
    *G05D 1/10*     (2006.01)
    *B64C 39/02*     (2006.01)

(56) References Cited

U.S. PATENT DOCUMENTS

| | | | |
|---|---|---|---|
| 2015/0066248 A1* | 3/2015 | Arbeit | G01C 21/20 701/2 |
| 2017/0069214 A1* | 3/2017 | Dupray | G08G 5/0013 |
| 2017/0088261 A1* | 3/2017 | Sequeira | G08G 5/00 |
| 2017/0131727 A1* | 5/2017 | Kurdi | G06Q 50/00 |
| 2018/0336788 A1* | 11/2018 | Singla | G08G 5/0021 |

OTHER PUBLICATIONS

E. T. Alotaibi, S. S. Alqefari and A. Koubaa, "LSAR: Multi-UAV Collaboration for Search and Rescue Missions," in IEEE Access, vol. 7, pp. 55817-55832, 2019, doi: 10.1109/ACCESS.2019.2912306. (Year: 2019).*

Arnold, Ross & Yamaguchi, Hiroyuki & Tanaka, Toshiyuki. (2018). Search and rescue with autonomous flying robots through behavior-based cooperative intelligence. Journal of International Humanitarian Action. 3. 10.1186/s41018-018-0045-4. (Year: 2018).*

Avezum, et al.; MODCAP: A Platform for Cooperative Search and Rescue Missions; 1$^{st}$ Workshop on Avionic Systems and Softaware Engineering @ SE19, Stuttgart, Germany; 2019; 4 Pges.

* cited by examiner

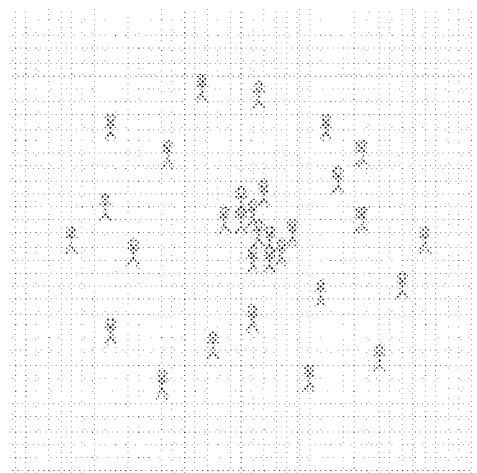
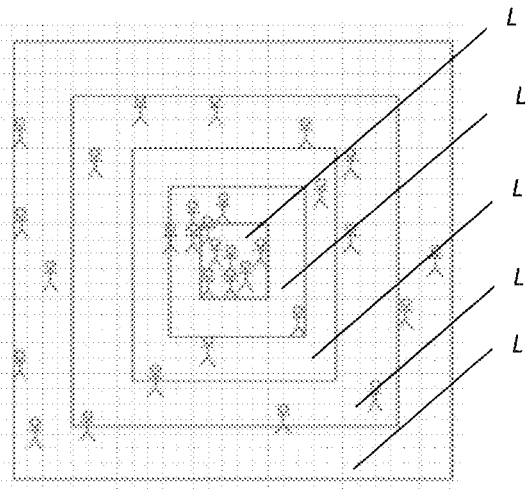
FIG. 6A  FIG. 6B
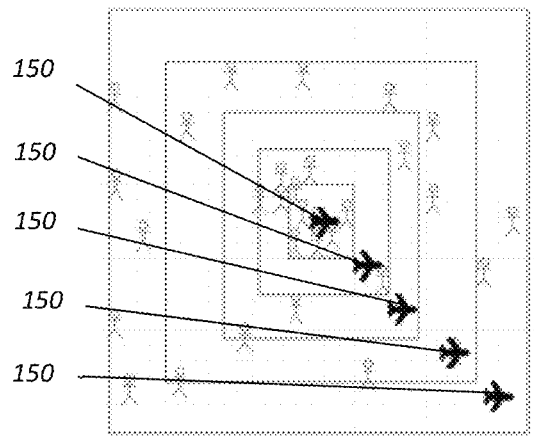
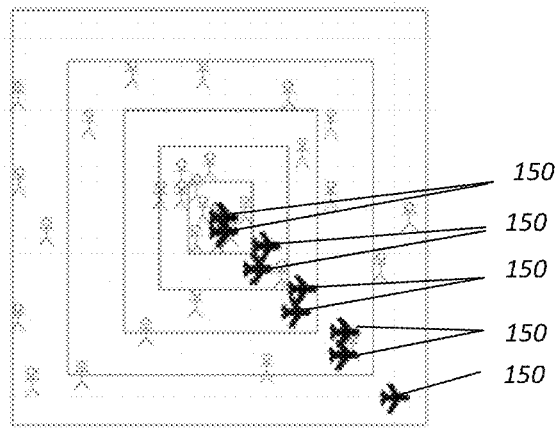
FIG. 7A  FIG. 7B

FIG. 8A 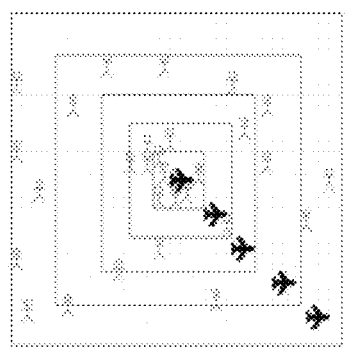 FIG. 8B 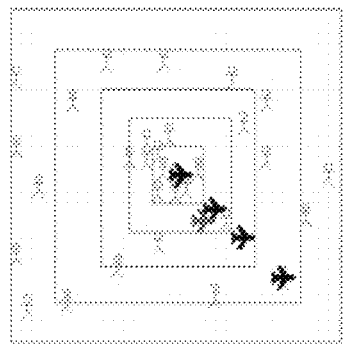 FIG. 8C 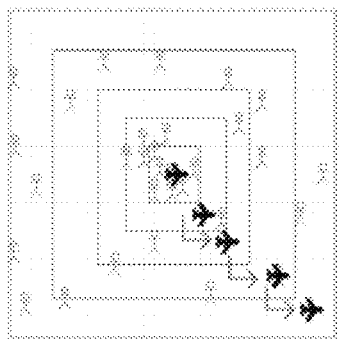
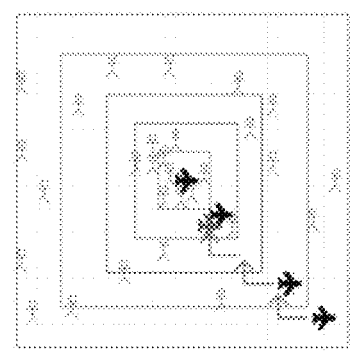 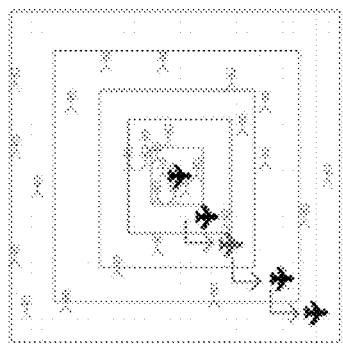
FIG. 8D  FIG. 8E

```
Algorithm 1: Partitioning
  Input  : disaster area described by its latitudes and
           longitudes $(x_{11}, y_{11}) (x_{12}, y_{12}) (x_{21}, y_{21})$
           $(x_{22}, y_{22})$, disaster's center latitude and
           longitude $(x_c, y_c)$
  Output: Set of layers $L$
1  region ← 1 x 1 unit
2  regions ← area / region
3  width ← number of adjacent regions horizontally
4  height ← number of adjacent regions vertically
5  Matrix[width][height] ← regions
6  Layer thickness ← $\lceil (width/2)/|P| \rceil$
7  if $|P| > width / 2$ then
8  |   layer number ← width/2
9  else
10 |   layer number ← $|P|$
11 end
12 $t \leftarrow 0$
13 $x \leftarrow 0$
14 while $x <$ layer number do
15 |   for $i \leftarrow 0,$ height do
16 |   |   for $j \leftarrow i,$ width $- i$ do
17 |   |   |   $L_x \leftarrow Matrix[i][j]$
18 |   |   |   $L_x \leftarrow Matrix[j][i]$
19 |   |   |   $L_x \leftarrow Matrix[j][width - i]$
20 |   |   |   $L_x \leftarrow Matrix[width - i][j]$
21 |   |   end
22 |   end
23 |   $t \leftarrow t + 1$
24 |   if $t =$ thickness then
25 |   |   $x \leftarrow x + 1$
26 |   |   $t \leftarrow 0$
27 |   end
28 end
```

FIG. 11

```
Algorithm 2: Cloud Server
  Input  : Planes set P, disaster area described by its
           latitudes and longitudes (x_11, y_11) (x_12, y_12)
           (x_21, y_21) (x_22, y_22), disaster's center latitude
           and longitude (x_c, y_c)
  Output: Online schedule
1 Layers set (L) ← Partitioning Algorithm (x_11, y_11)(x_12,
    y_12)(x_21, y_21)(x_22, y_22)(x_c, y_c)
2 for i ← 0,|P| and x ← 0,|L| do
3  |   P_i[type] ← SEARCHER
4  |   if i > |L| then
5  |   |   i=i mod |L| Assign P_i to layer L_i
6  |   else
7  |   |   Assign P_i to layer L_x
8  |   end
9 end
10 if call(x) is received then
11 |   if call[type] is helpCall at layer L_x then
12 |   |   if |P| at layer L_x = 1 then
13 |   |   |   P_{x+1} [type] ← RESCUER
14 |   |   |   Assign P_{x+1} to layer L_x
15 |   |   |   for i ← x + 1,|P| do
16 |   |   |   |   P_i[type] ← SEARCHER
17 |   |   |   |   Assign P_i to layer L_{i-1}
18 |   |   |   end
19 |   |   else
20 |   |   |   P_x [type] ← RESCUER
21 |   |   end
22 |   end
23 |   if call[type] is notificationCall at layer L_x then
24 |   |   P_{x+1} [type] ← SEARCHER
25 |   |   if |P| at layer L_x = 1 then
26 |   |   |   for i ← x,|P| do
27 |   |   |   |   P_i[type] ← SEARCHER
28 |   |   |   |   Assign P_i to layer L_{i+1}
29 |   |   |   end
30 |   |   end
31 |   end
32 end
```

FIG. 12

```
Algorithm 3: Phase
  Input  : Assigned Layer L_x
  Output : Online search and rescue missions
1 while time ≤ mission time do
2   │ if P_i[type] is SEARCHER for layer L_x then
3   │ │   Search for a survivor in the layer L_x
4   │ │   if a survivor s is found then
5   │ │   │   L_x[SurvivorList] ← s
6   │ │   end
7   │ │   if |L_x[SurvivorList]| ≥ survivorThreshold then
8   │ │   │   Call (helpCall, cloud server, x)
9   │ │   end
10  │ end
11  │ if P_i[type] is RESCUER for layer L_y then
12  │ │   Rescue all survivors ∈ L_y[SurvivorList]
13  │ │   if L_y[SurvivorList] = Φ then
14  │ │   │   Call (notificationCall, cloud server, y)
15  │ │   end
16  │ end
17  │ if L_y is fully explored ∧ L_y is not last layer then
18  │ │   Assign P_i to layer L_y + 1
19  │ end
20 end
```

FIG. 13

SYSTEM, APPARATUS, AND METHOD FOR CONTROLLING UNMANNED AERIAL VEHICLES FOR SEARCH AND RESCUE

SUMMARY

Field of the Invention

Generally, the present disclosure involves systems, apparatuses, and methods for controlling unmanned aerial vehicles (UAVs) during a search and rescue mission.

Background

Embodiments of the disclosed subject matter can be directed to or involve a non-transitory computer-readable storage medium storing computer-readable instructions that, when executed by one or more computers, cause the one or more computers to perform a Layered Search and Rescue (LSAR) method using a plurality of Unmanned Aerial Vehicles (UAVs). The LSAR method can comprise: receiving data corresponding to a center of an area corresponding to an adverse/disaster event potentially having survivors at unknown locations in the area; performing a partitioning operation of dividing the area into a set of incremental, numbered box-shaped layers based on coordinates defining perimeter portions of the area and coordinates of the center of the area; calculating a thickness of the box-shaped layers based on a standard unit and a total number of the Unmanned Aerial Vehicles; exclusively assigning one or more of the Unmanned Aerial Vehicles to each box-shaped layer based on the total number of Unmanned Aerial Vehicles; and controlling the Unmanned Aerial Vehicles to perform a search and rescue mission in the area by selectively switching one or more of the Unmanned Aerial Vehicles between a searcher mode and a rescuer mode. The receiving data can be based on an emergency call from the area. The controlling can include initializing all of the Unmanned Aerial Vehicles to the searcher mode to search for survivors in the respectively assigned box-shaped layers, wherein in the searcher mode each said Unmanned Aerial Vehicles can be controlled to identify survivors and record locations of the identified survivors.

In one or more embodiments, a distributed system can be configured to perform a search and rescue mission according to a Layered Search and Rescue (LSAR) methodology. The distributed system can comprise: a remote server having a first processor; and a plurality of Unmanned Aerial Vehicles (UAVs) communicatively connected to each other via the remote server to perform the search and rescue mission, where each of the Unmanned Aerial Vehicles can have a second processor, memory, and sensors operatively connected to the second processor. The remote server can be configured to: receive data corresponding to a center of an area corresponding to an adverse/disaster event potentially having survivors at unknown locations in the area, perform a partitioning operation of dividing the area into a set of incremental, numbered box-shaped layers based on coordinates defining perimeter portions of the area and coordinates of the center of the area, calculate a thickness of the box-shaped layers based on a determination of a total number of available Unmanned Aerial Vehicles of the plurality of Unmanned Aerial Vehicles, assign one or more of the available Unmanned Aerial Vehicles to each box-shaped layer based on the calculated thickness and the determined total number of available Unmanned Aerial Vehicles, and control the available Unmanned Aerial Vehicles to perform the search and rescue mission in the area. The remote server can be configured to perform the following operations when the one or more available Unmanned Aerial Vehicles assigned to each box-shaped layer includes only one of the Unmanned Aerial Vehicles per box-shaped layer: set all of the available Unmanned Aerial Vehicles to a searcher mode to search for survivors in the respectively assigned box-shaped layers, and responsive to receipt of a helping call from a first Unmanned Aerial Vehicle of the available Unmanned Aerial Vehicles, control all available Unmanned Aerial Vehicles in assigned box-shaped layers radially outward of a currently assigned box-shaped layer of said first Unmanned Aerial Vehicle to undergo radially inward shifts to respective immediately adjacent box-shaped layers, wherein the controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to a rescuer mode, and controlling all other Unmanned Aerial Vehicles radially outward of said second Unmanned Aerial Vehicle to remain in the searcher mode. The remote server can also be configured to perform the following operations when the one or more available Unmanned Aerial Vehicles assigned to each box-shaped layer includes more than one Unmanned Aerial Vehicle per box-shaped layer: set all of the available Unmanned Aerial Vehicles to the searcher mode to search for survivors in the respectively assigned box-shaped layers, and responsive to receipt of the helping call from the first Unmanned Aerial Vehicle of the available Unmanned Aerial Vehicles, control another Unmanned Aerial Vehicle in the currently assigned box-shaped layer, which is the same as for said first Unmanned Aerial Vehicle, to switch from the searcher mode to the rescuer mode while said first Unmanned Aerial Vehicle remains in the searcher mode.

Embodiments of the disclosed subject matter can be directed to or involve a Layered Search and Rescue (LSAR) method implemented by a cloud server and a team of autonomous Unmanned Aerial Vehicles (UAVs) communicatively connected to each other via the cloud server to perform a search and rescue mission. The LSAR method can comprise: providing the Unmanned Aerial Vehicles, each of the Unmanned Aerial Vehicles having processing circuitry, memory, and multi-modal sensors operatively connected to the processing circuitry; receiving, at the cloud server, data corresponding to a center of an area corresponding to an adverse/disaster event potentially having survivors at unknown locations in the area, said receiving being based on an emergency call from the area; unifying, using the cloud server, a standard unit for a region of the area corresponding to a smallest location unit; performing, using the cloud server, a partitioning operation of dividing the area into a set of incremental, numbered box-shaped layers based on coordinates defining perimeter portions of the area and coordinates of the center of the area; calculating, using the cloud server, a thickness of the box-shaped layers on a basis of the standard unit and based on a determination of a total number of the Unmanned Aerial Vehicles of the team; assigning, using the cloud server, a unique set of one or more of the Unmanned Aerial Vehicles to the box-shaped layers based on the calculated thicknesses and the determined total number of Unmanned Aerial Vehicles of the team; and controlling, using the cloud server and the Unmanned Aerial Vehicles, the Unmanned Aerial Vehicles to perform the search and rescue mission in the area. The controlling can include switching of one or more of the Unmanned Aerial Vehicles between a searcher mode and a rescuer mode according to the following: when the unique set of one or more of the Unmanned Aerial Vehicles assigned to the box-shaped layers includes only one of the Unmanned Aerial Vehicles per box-shaped layer the method further comprises: setting all of the Unmanned Aerial Vehicles to the searcher mode to search for survivors in the respectively assigned box-shaped layers, making a helping call to the cloud server, by a first Unmanned Aerial Vehicle of the Unmanned Aerial Vehicles, based on found survivor information in a currently assigned box-shaped layer of the box-shaped layers for said first Unmanned Aerial Vehicle, and responsive to said making the helping call, controlling all Unmanned Aerial Vehicles in assigned box-shaped layers radially outward of the currently assigned box-shaped layer of said first Unmanned Aerial Vehicle to undergo radially inward shifts to respective immediately adjacent box-shaped layers, wherein said controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to the rescuer mode, and controlling all other Unmanned Aerial Vehicles radially outward of said second Unmanned Aerial Vehicle to remain in the searcher mode; and when the unique set of one or more of the Unmanned Aerial Vehicles assigned to the box-shaped layers includes more than one Unmanned Aerial Vehicle per box-shaped layer the method further comprises: setting all of the Unmanned Aerial Vehicles to the searcher mode to search for survivors in the respectively assigned box-shaped layers, making the helping call to the cloud server, by the first Unmanned Aerial Vehicle of the Unmanned Aerial Vehicles, based on the found survivor information in the currently assigned box-shaped layer, and responsive to said making the helping call, controlling another Unmanned Aerial Vehicle in the currently assigned box-shaped layer, which is the same as for said first Unmanned Aerial Vehicle, to switch from the searcher mode to the rescuer mode while controlling said first Unmanned Aerial Vehicle to remain in the searcher mode.

Embodiments can also include methods of providing, making, and/or using devices and systems, or portions thereof, according to one or more embodiments of the disclosed subject matter. Further, methods according to one or more embodiments of the disclosed subject matter may be computer-implemented methods in whole or in part, for instance, via a non-transitory computer-readable storage medium storing computer-readable instructions that, when executed by one or more computers, cause the computer to perform the method.

The preceding summary is to provide an understanding of some aspects of the disclosure. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, illustrate one or more non-limiting embodiments and, together with the description, explain these non-limiting embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 6(a)-6(b) diagrammatically represent exemplary layer creation in a partitioned area according to one or more embodiments of the disclosed subject matter.

FIGS. 7(a)-7(b) diagrammatically represent exemplary UAV layer assignment according to one or more embodiments of the disclosed subject matter.

FIGS. 8(a)-8(e) diagrammatically represent exemplary Layered Search and Rescue (LSAR) methodology for search and rescue according to one or more embodiments of the disclosed subject matter.

FIG. 11 is an exemplary partitioning algorithm according to one or more embodiments of the disclosed subject matter.

FIG. 12 is an exemplary algorithm according to one or more embodiments of the disclosed subject matter.

FIG. 13 is an exemplary algorithm according to one or more embodiments of the disclosed subject matter.

DETAILED DESCRIPTION

Figure 1:
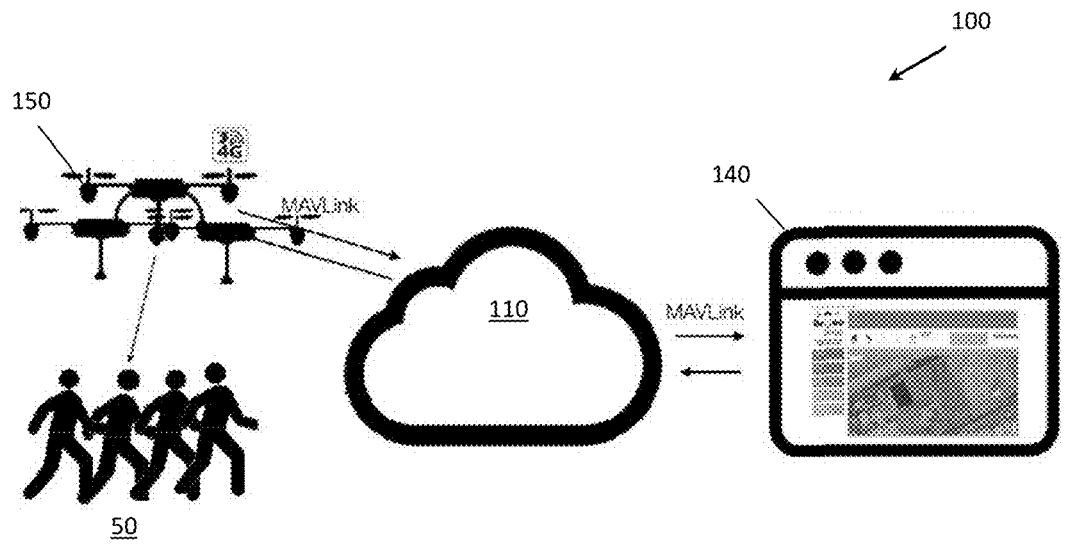
FIG. 1 is a block diagram of a system according to one or more embodiments of the disclosed subject matter.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more" or "at least one." The phrases "at least one," "one or more," "or," and "and/or" are open-ended expressions that can be both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" can mean A alone, B alone, C alone, A and B together, A and C together, B and C together, or A, B and C together. It is also to be noted that the terms "comprising," "including," and "having" can be used interchangeably.

It is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Control aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "circuitry," "module" or "system." Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, device, or portion thereof.

As noted above, the disclosed subject matter can broadly include or is broadly directed to systems, devices, and methods for performing search and rescue (SAR) missions using a team of Unmanned Aerial Vehicles (UAVs). Search and rescue missions, according to embodiments, of the disclosed subject matter, can involve an adverse, disaster, or emergency situation or event, such as an earthquake, flood, fire, explosion, terrorist event, missing persons situation, or vehicular accident. Moreover, SAR missions according to embodiments of the disclosed subject matter can be in the context of one or more of the following settings: maritime, combat, urban, and non-urban (e.g., wilderness) settings.

The use of UAVs in search and rescue applications, according to embodiments of the disclosed subject matter, can provide an effective and efficient means by which to assess and address the particular situation, including to identify an area associated with the event (e.g., including perimeter, center, and regions) potentially having survivors at unknown locations in the area, to identify existence of survivors (including potential survivors), to identify locations of survivors, and/or to rescue the identified survivors. As used herein, the term rescue can mean (i) confirming a location of an identified survivor and sending a help signal to a rescue entity (e.g., police, fire, ambulance, helicopter, etc.) with the coordinates of the identified survivor and any additional information detected by one or more UAVs associated with the search and rescue operation that may be helpful for the rescue of the survivor (e.g., terrain, risk factor, survivor condition, etc.); (ii) providing supplies to the survivor (e.g., water, food, medical supplies); (iii) providing a physical marker (e.g., a flare, beacon, smoke, etc.) at the identified location of the survivor; and/or (iv) physically retrieving the survivor, for instance, for transport out of the area.

Embodiments of the disclosed subject matter can control multiple UAVs, which may be autonomous, to implement or perform a search and rescue (SAR) mission according to a particular search and rescue methodology. The particular methodology, according to embodiments of the disclosed subject matter, may be referred to as a Layered Search and Rescue (LSAR) methodology. The LSAR methodology deploying for the same SAR mission multiple UAVs that can operate autonomously and without direct user control, can address a Multi-UAV Task Allocation (MUTA) problem, and can minimize time for SAR missions while also rescuing a maximum number of survivors relative to other SAR methodologies (e.g., Max-Sum, Auction-based, Locust-Inspired approach for Multi-UAV Task Allocation (LIAM), and Opportunistic Task Allocation (OTA) schemes).

In general, the MUTA problem for SAR missions may be characterized as finding an unknown number of survivors in a planar search area, where the locations of the survivors are not known in advance. LSAR methodologies according to embodiments of the disclosed subject matter can address the MUTA problem based on the assumption that a relatively larger number of survivors can be found closer to a center of the adverse/disaster/emergency situation or event and by relying on computationally relatively less complex parameters that can be measured locally at each UAV. Thus, the UAVs can have the capability to search for and rescue survivors under autonomous control according to efficient and effective search and rescue operations focusing more on the center of an area associated with the adverse/disaster/emergency situation or event and gradually less in a radially outward direction. Additionally, the UAVs can be wirelessly connected, over one or more networks (e.g., cellular, Internet) to a remote processor (or processors) (e.g., cloud-based server) configured to coordinate the SAR mission. That is, the LSAR methodology can be centralized in the sense that the LSAR operations (e.g., according to an LSAR algorithm) can be performed by the UAVs based on communication between the UAVs and the remote processor coordinating the SAR mission.

Turning to the figures, FIG. 1 is a block diagram of a system 100 according to one or more embodiments of the disclosed subject matter. The system can be comprised of a central processor 110, a control interface 140, and a plurality of Unmanned Aerial Vehicles (UAVs) or drones 150 (represented as a single UAV 150). As noted above, the system 100 can provide a team of available UAVs 150 connected through central processor 110 and controlled in collaboration according to a LSAR methodology implemented by the central processor 110 in conjunction with control (e.g., control settings) from the control interface 140 to search for and rescue one or more survivors 50 in an area associated with an adverse/disaster/emergency situation or event. According to one or more embodiments, data passed between the UAVs 150 and the central processor 110 and/or data passed between the central processor 110 and the control interface 140 may be encrypted.

Figure 2:
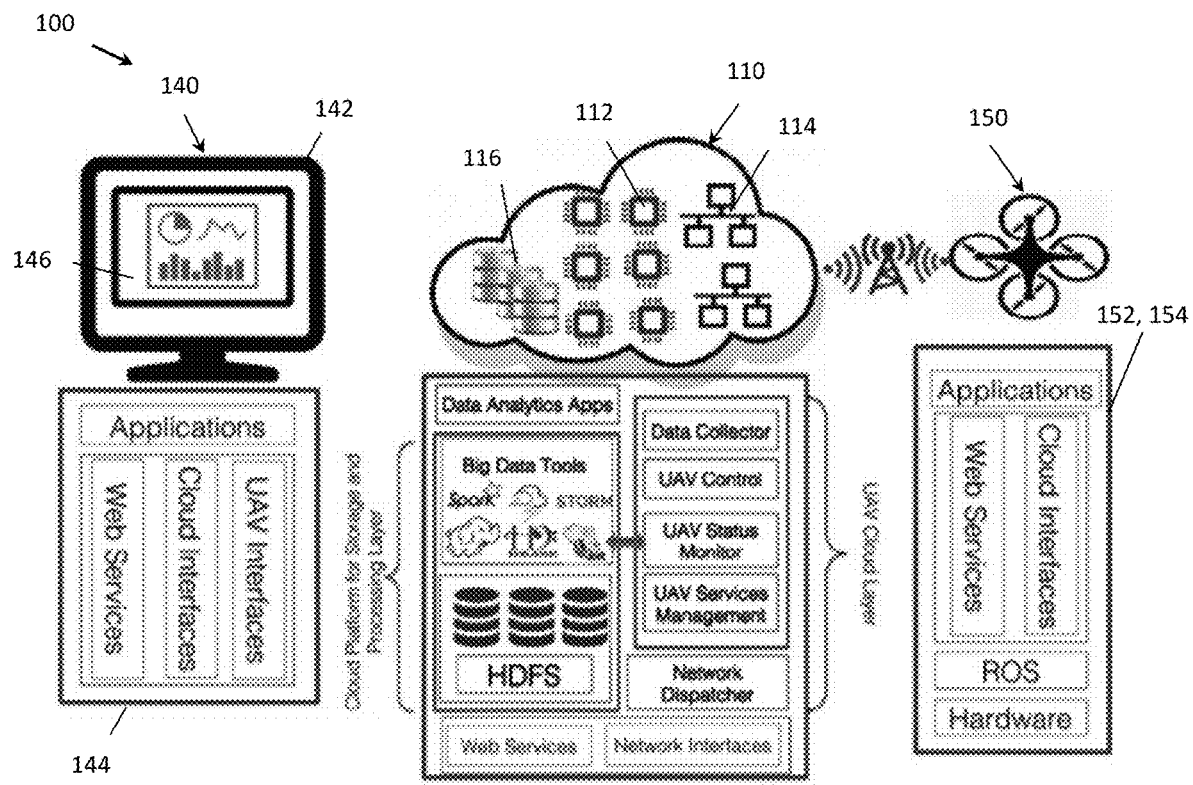
FIG. 2 is a block diagram of a system architecture according to one or more embodiments of the disclosed subject matter.

Referring now to FIG. 1 and FIG. 2, the latter of which showing an exemplary system architecture for system 100, the central processor 110 can be a server, for instance, a cloud server, operatively connected to the control interface 140 and the UAVs 150. The central processor 110 can be communicatively coupled to the control interface 140 and the UAVs 150 via respective networks according to respective communication protocols. For example, according to one or more embodiments, the UAVs 150 can be in wireless communication with the central processor 110 via a cellular-based network (e.g., 3G, 4G, 5G) and according to MAV-Link protocol, such as shown in FIG. 1. The control interface 140 may also communicate with the central processor 110 via MAVLink protocol, for instance.

As shown in FIG. 2, the central processor 110 may be comprised of a plurality of processors 112, distributed processors, for instance, and corresponding networks 114, memories 116, interfaces, etc., to store, call, and implement LSAR methodologies (e.g., load processor(s) with on LSAR algorithms, such as Algorithm 2 discussed below, to configure the processor(s) to perform particular LSAR SAR method) according to embodiments of the disclosed subject matter, as well as to send and receive control and/or data signals relative to the control interface 140 and the UAVs 150 to enact, coordinate, and control the SAR mission according to the LSAR methodology. According to one or more embodiments, the central processor 110 can have or otherwise implement data analytics applications, big data tools, Hadoop Distributed File System (HDFS), web services, network interfaces, a network dispatcher, UAV services management, UAV status monitor, UAV control, and/or a data collector. Such aspects can be implemented in hardware, software, or a combination of hardware and software. The big data tools and HDFS may be part of a cloud platform for storage and processing layer of the system architecture, and the a network dispatcher, UAV services management, UAV status monitor, UAV control, and a data collector may be part of a UAV cloud layer of the system architecture.

The control interface 140 can be a user interface adapted to control the UAVs 150. According to one or more embodiments, the control interface 140 can be a fixed or mobile computer 142, such as a PC, a tablet, video game console, or a cellular phone having a processor (or processing circuitry) 144, memory, and a display 146. Optionally, the display 146 can have a graphical user interface, such as a touch screen. According to one or more embodiments, the control interface 140 can have or otherwise implement various applications, web services, cloud interfaces, and UAV interfaces.

Though the UAVs 150 can be autonomous as noted above, and can operate according to a particular LSAR methodology, the control interface 140 can be configured to identify and select a number and/or type of UAVs 150 for the SAR mission, initiate the SAR mission, modify the SAR mission prior to or during the SAR mission, terminate the SAR mission, etc. The control interface 140 may also be able to capture information specific to the SAR mission, including data sent from the UAVs 150 and/or the central processor 110, such as number of identified survivors, status of each UAV 150, position of each UAV 150, calculated estimated time to completion of the SAR mission, and information regarding the search and rescue area (e.g., size, terrain, UAVs 150 per layer), etc. According to one or more embodiments at least the central processor 110 and optionally the control interface 140 may be a cloud-based management system in the form of an Internet-based Drone Mission Controller and a Dronemap Planner Cloud (Cloud Server), respectively, to control the UAVs 150 via the Internet.

Figure 3:
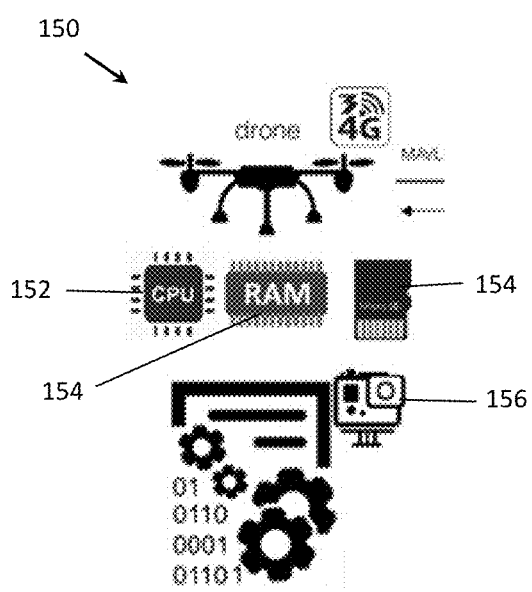
FIG. 3 is a diagram of an Unmanned Aerial Vehicle (UAV) or drone according to one or more embodiments of the disclosed subject matter.

Referring now to FIG. 2 and FIG. 3 and the UAVs 150, each of the UAVs 150 can be a rotary UAV (e.g., helicopter) or a fixed-wing UAV (e.g., plane). Optionally, the UAVs 150 can be a mix of different types or configurations of UAVs, such as different types of rotary UAVs, or a mix of rotary and fixed-wing UAVs. Each UAV 150 can have a processor (or processing circuitry) 152, one or more memories 154, one or more sensors 156, and a power supply (e.g., one or more batteries). The one or more sensors 156 of the UAV 150 can be characterized as multi-modal, for instance, one or more visual sensors (e.g., still and/or moving pictures, movement detection, gaze detection, etc.), one or more audio sensors, one or more temperature sensors, thermal sensors, etc. to detect, identify, and rescue survivors. Data from the one or more sensors 156 can also be sent to the central processor 110 and the control interface 140 to begin or set up the searching once the UAVs 150 are at the area and to provide real-time data (e.g., UAV position data, survivor location coordinates, etc.) for the coordination and control of the SAR mission according to the LSAR methodology.

At least one of the memories 154 of each UAV 150 can store, call, and implement LSAR methodologies (e.g., load processor(s) with on LSAR algorithms, such as Algorithm 3 discussed below, to configure the processor 152 to perform particular LSAR SAR method) according to embodiments of the disclosed subject matter. However, though the UAVs 150 can have the processor (or processing circuitry) 152, the one or more memories 154, the one or more sensors 156, and the power supply (e.g., one or more batteries), such capacities of the UAVs 150 may be relatively limited. As such, some or all of the computations regarding the LSAR operations can be offloaded from the UAVs 150 to the central processor 110.

According to one or more embodiments, each UAV 150 can have or otherwise implement various applications, web services, cloud interfaces, Robot Operating System (ROS), and hardware.

Figure 4:
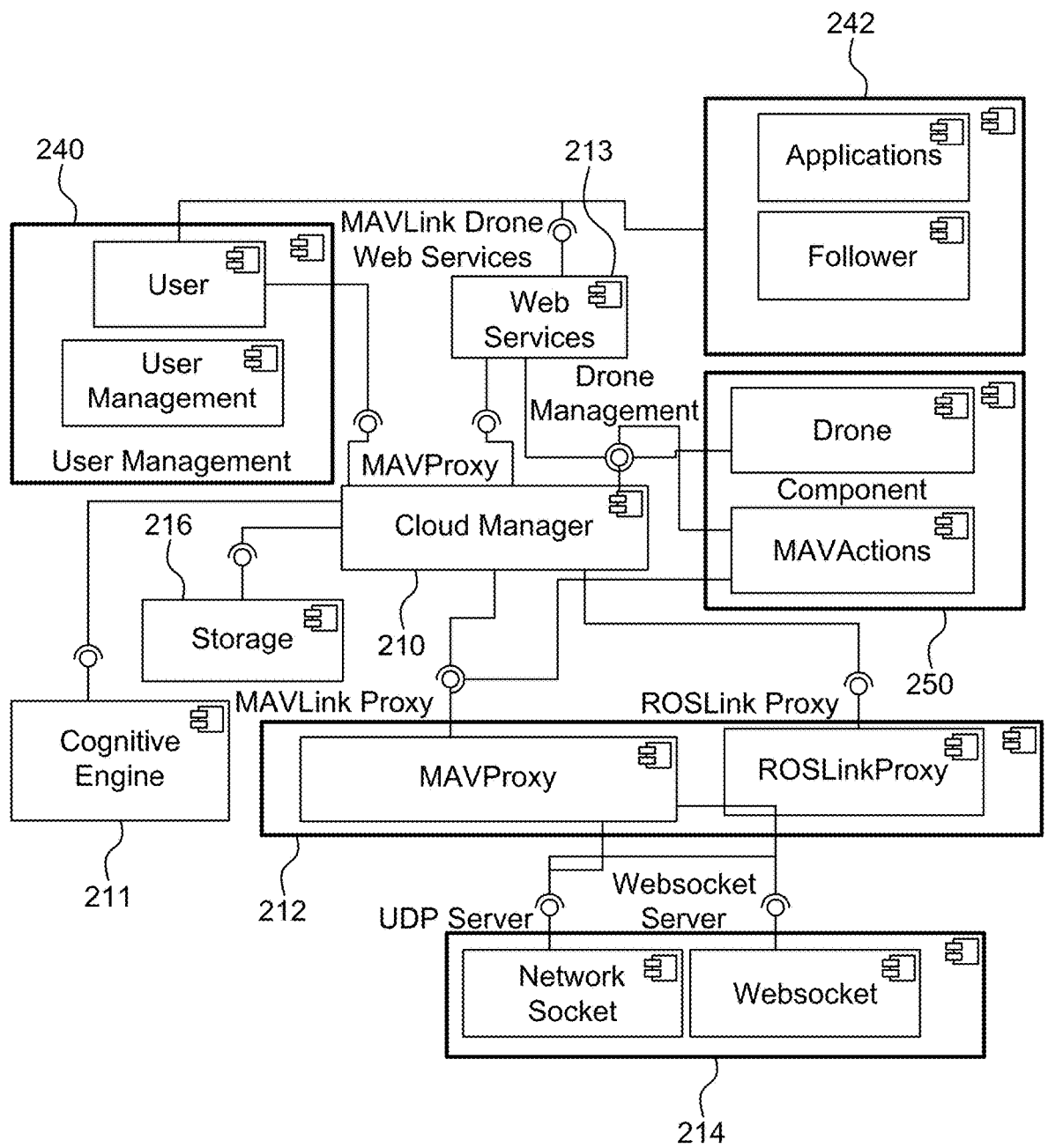
FIG. 4 is a block diagram of an exemplary software architecture according to one or more embodiments of the disclosed subject matter.

FIG. 4 is a block diagram of an exemplary software architecture of the system 100 according to one or more embodiments of the disclosed subject matter. The software architecture can include a manager module 210, a proxy module 212, a network module 214, a user module 240, an applications module 242, and a UAV module 250. The software architecture can also include memory 216, cognitive engine module 211, and web services module 213.

The manager module 210, which can be implemented using central processor 110, can interface with cognitive engine 211, memory 216, user module 240 (e.g., via MAVproxy), web services module 213, UAV module 250, and proxy module 212, such as shown in FIG. 4. The network module 214, which can include a network socket and a websocket, can be for interfacing of the proxy module 212, which may include a MAV proxy submodule and a ROSLinkProxy submodule, to a UDP server and a websocket server, for instance. The MAV proxy submodule of the proxy module 212 can also interface with the UAV module 250, for instance, a MAVActions submodule thereof, which itself can interface with the manager module 210, a drone submodule of the UAV module 250, and the web services module 213. The web services module 213 can interface with the user module 240 and the applications module 242 via MAVLink Drone Web Services, for instance.

Figure 5A:
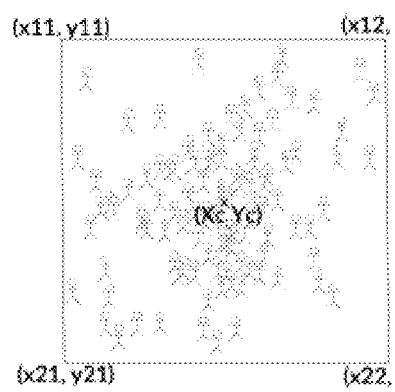
FIGS. 5(a)-5(d) diagrammatically represent exemplary partitioning of an area associated with an adverse or disaster event and layer creation in the partitioned area according to one or more embodiments of the disclosed subject matter.

As noted above, the LSAR methodology can be a centralized methodology based on the assumption that a relatively larger number of survivors can be found closer to a center of the adverse/disaster/emergency situation or event. The center of the adverse/disaster/emergency situation or event can be detected or otherwise identified by using the central processor 110. For example, according to one or more embodiments, a call (e.g., telephone call to an emergency operator) can be made from the area indicating an adverse/disaster/emergency situation or event. The call can come directly to the central processor 110 or can be routed to the central processor 110. Optionally, the call can be in real time. The central processor 110 can set as the middle of the area the coordinates from where the call came or coordinates based on information provided in the call. The central processor 110 can also set a predetermined area around the determined center. Such predetermined area may be set based on the type of adverse/disaster/emergency situation or event, type of terrain (e.g., land, water, flat, mountainous, etc.), weather conditions, and/or search and rescue resources, such as number and types of available UAVs 150, which may be set in advance, for instance, using the control interface 140. FIG. 5(a) shows an example of a predetermined area associated with an adverse/disaster/emergency situation or event having an unknown number of survivors in unknown locations. Notably, the center of the predetermined area can be set as (Xc, Yc) and the corners of the area may be set as (x11, y11), (x12, y12), (x22, y22), and (x21, y21). The coordinates may be longitude and latitude, respectively. The area may be box-shaped, for instance, square as shown in FIG. 5(a).

From this point LSAR methodologies according to embodiments of the disclosed subject matter can implement the following phases: an environmental partitioning phase, which can include sampling the area; and a search and rescue phase, which can include a team of available UAVs 150 connected through a network (e.g., cloud network) to perform a SAR mission, as coordinated by the central processor 110.

Figure 5B:
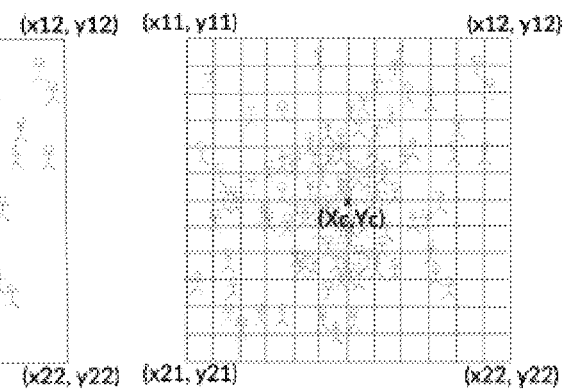
Figure 5C:
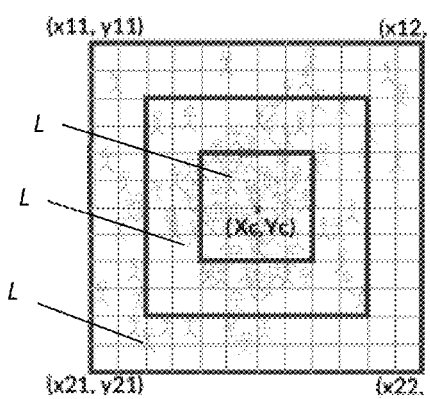
Figure 5D:
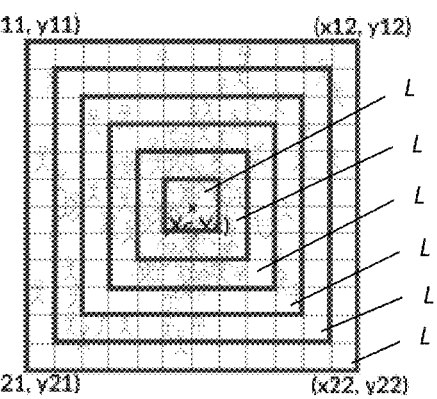

The partitioning phase, which can be implemented using the central processor 110, can involve dividing the area, identified by coordinates including at least the center and perimeter portions (e.g., corners), into a set of layers L. The layers L of the set, which can be box-shaped, can be numbered incrementally starting from the center of the area radially outward and concentric with the center of the area (e.g., layer at center is layer zero). FIG. 5(c) shows an example of the area divided into three box-shaped layers L, FIG. 5(d) shows an example of the area divided into six box-shaped layers L, and FIG. 6(a) shows an example of the area divided into five box-shaped layers L. The sizes of the box-shaped layers L can increase from the center radially outward. The increase can be uniform, such as shown in FIG. 5(c) and FIG. 5(d) or non-uniform such as shown in FIG. 6(b). Discussed in more detail below, the number of layers L may be set based on a number of available UAVs 150. For instance, less available UAVs 150 for the SAR mission in the area may mean less layers L. According to one or more embodiments, the partitioning phase can be carried out according to Algorithm 1 in FIG. 11. That is, the central processor 110 can have one or more processors 112 thereof configured to run Algorithm 1 to partition the area.

According to embodiments of the disclosed subject matter, as part of the partitioning phase the dividing can be preceded by unifying or setting, using the central processor 110, a standard unit for regions of the area to be divided. Such standard unit may represent a smallest location unit specified by its coordinates. The standard unit may be one meter, one kilometer, etc., for instance, one meter by one meter or one kilometer by one kilometer. The central processor 110 may then determine how many regions (of the standard unit) are contained in the area and create a matrix for the sampling of the real environment during the SAR mission as sets of the regions. FIG. 5(b) and FIG. 6(a), for instance, show a plurality of square regions as the standard unit formed into a matrix. The foregoing operations can be carried out according to Algorithm 1, as an example.

Thickness of layers L can be defined in terms of adjacent regions (of the standard unit). For example, in the case where the layers L increment by two regions per box-shaped layer L, each layer L can have two rows (upper and lower rows) and two columns (right and left columns). Hence, the central processor 110 can calculate the thicknesses of layers L according to the width/2 or height/2. The thicknesses can also be calculated based on the number of available UAVs 150. For example, in FIG. 5(c) and FIG. 5(d) the height and width are twelve units (i.e., twelve regions). If the number of available UAVs 150 is seven, then the thickness of the layers L can be one unit (i.e., (12/2)/7), such as shown in FIG. 5(d). As another example, if the number of available UAVs 150 is three, then the central processor 110 can set the thickness of the layers L as two units (i.e., (12/2)/3). In this regard, note that the middle layer L (i.e., layer zero) can be twice the thickness or once the thickness starting from the center of the area working outward. Thus, in the example of FIG. 5(c), the number of layers L can be set as three, whereas in the example of FIG. 5(d) the number of layers L can be set as six. Optionally, as shown in FIG. 6(b), for instance, the thicknesses of the layers L can vary. For instance, one or more outer layers L may be more thick than one or more inner layers L. The foregoing operations can be carried out according to Algorithm 1, as an example.

Once the environment is sampled as the matrix of regions, the central processor 110 can create layer lists with indexes to corresponding regions in the particular layers L. The list can include the coordinates of the regions, for instance. The lists can be created in sections. For instance, the regions in the upper border may be filled into the list for the outer layer L, followed by the right border, then the left border, then the bottom border. The process can repeat for the remaining regions of the remaining layers L. Thus, the central processor 110 can generate a list of the layers L having respective sets of regional coordinates exclusively indexed to the different layers L. Discussed in more detail below, the lists can be used to record locations of found survivors. For example, the regions of a list per layer L may be updated to reflect one or more survivors have been found and correlate locations of the regions corresponding to where the one or more survivors are found. The foregoing operations can be carried out according to Algorithm 1, as an example.

The central processor 110 can set the number of UAVs 150 per layer L based on the number of available UAVs 150 and the number of layers L. Generally, there may be two scenarios: one where a single UAV 150 is assigned to each layer L and another where more than one UAV 150 is assigned to one or more of each of the layers L. FIG. 7(a) shows an example of the former and FIG. 7(b) shows an example of the latter. That is, the central processor 110 can implement a special way to distribute UAVs 150 over the layers L to reflect the LSAR argument: assuming number of UAVs planes |P| equals to the number of layers, the central processor 110 can set every UAV 150 as a searcher and assign the UAV 150 to each layer in one-to-one manner (e.g., assigns UAV 150-x to layer x) starting from layer number zero (center layer) toward outer layers L. When the number of UAVs 150 |P| is greater than the number of defined layers |L|, the central processor 110 can reassign the remaining UAVs 150 to layers L starting by layer number zero toward outer layers until the UAVs 150 are assigned completely. In this way, any extra UAVs 150 can be assigned to layers with higher probability to locate survivors. As shown in FIG. 6(b), for instance, one or more of the layers L may have less number of UAVs 150 than inner layers L. The foregoing operations can be carried out according to Algorithm 2 in FIG. 12, as an example.

Each UAV 150 can switch between a searcher mode and a rescuer mode. In the case one UAV 150 assigned per layer L, such as shown in FIG. 8(a), the UAVs 150 initially can be set to the searcher mode, for instance, by the central processor 110. In the searcher mode the UAVs 150 search for survivors in their respective assigned layers L. The UAVs 150 can use at least one of the one or more sensors 156 to search for survivors. For example, the UAVs 150 can use a sensor in the form of a camera and/or a sensor in the form of an audio receiver to detect survivors. In this example, a survivor may be identified by movement, facial recognition, or thermal imagery as detected by one or more cameras forming the sensors 156 or sounds such as oral messaging. If a survivor is found, the UAV 150 in the searcher mode adds a location (e.g., longitude and latitude) of the identified survivor to a list of survivors for the particular layer L. Such list may be stored locally at the UAV 150 and/or transmitted to the central processor 150 as a master list for each of the layers L. Such operations can be performed locally at each UAV 150, for instance, using processor 152, according to Algorithm 3 in FIG. 13, as an example.

The UAV 150 can also check the list of survivors, for instance, periodically or after adding each or a predetermined number of survivors to the list to determine whether a predetermined threshold in the number of survivors on the list has been reached, and, if so, the UAV 150 can send a call (e.g., a help call) to the central processor 110 according to Algorithm 3, for instance.

In response to the call, the UAV 150 meeting the predetermined threshold for number of survivors (in the assigned layer L) and all UAVs 150 outward of such UAV 150 can be controlled so as to shift inward by one layer L, such as shown in FIG. 8(b) and FIG. 8(d). That is, FIGS. 8(b) and 8(d) shows an example whereby the UAV 150 of the second layer L sends the call and all UAVs 150 outward therefrom move inward by one layer L. This can mean that the second layer L can now have two UAVs 150 and the outer layer L may not have any UAVs 150. The inward movement of the UAVs 150 can be such that current missions of the UAVs 150 (i.e., search missions) in their current respective layers L are interrupted so the UAVs 150 can move inward and be controlled according to another search mission for the new layer L. Optionally, data regarding the interrupted missions (e.g., position, survivor list at the time of shift, etc.) can be saved locally at the shifting UAVs 150 and/or transferred to the central processor 110. Such control can be under the direction of the central processor 110, for instance, according to Algorithm 2, as an example. Moreover, such control can be based on the probability of locating survivors in inward layers L being higher than those of outer layers L.

The UAV 150 moving into the same layer L as the UAV 150 making the call can transition to the rescuer mode. All other UAVs 150 shifting inward can remain in the searcher mode in their new respective layers L. The UAV 150 that transitions to the rescuer mode can rescue all survivors according their locations as recorded in the survivor list for the layer L having the searcher UAV 150 and the rescuer UAV 150. Such list may be transmitted to the rescuer UAV 150 from the central processor 110 and/or the searcher UAV 150 in the same layer L. The rescuer UAV 150 can operate in the rescuer mode according to Algorithm 3, for instance. When the rescuer UAV 150 has rescued all survivors in the new layer L, the rescuer UAV 150 can send a notification to the central processor 110 reporting that all survivors from the list of survivors in the current layer L have been rescued.

When the central processor 110 receives the notification call coming from the rescuer UAV 150, the rescuer UAV 150 can transition back to the searcher mode and then all UAVs 150 from the layer L from which the notification call came outward can be shifted outward by one layer L, such as shown in FIG. 8(c) and FIG. 8(e). Thus, the inwardly shifted UAVs 150 can be back in their respective previous layers L. Such control can be under the direction of the central processor 110, for instance, according to Algorithm 2, as an example. The outwardly shifted UAVs 150 can then continue their previous search from the point of interruption, for instance. As alluded to above, the resumed searching can be recovered based on the list of survivors attached to each layer L.

Figures 9A, 9B, 9C:
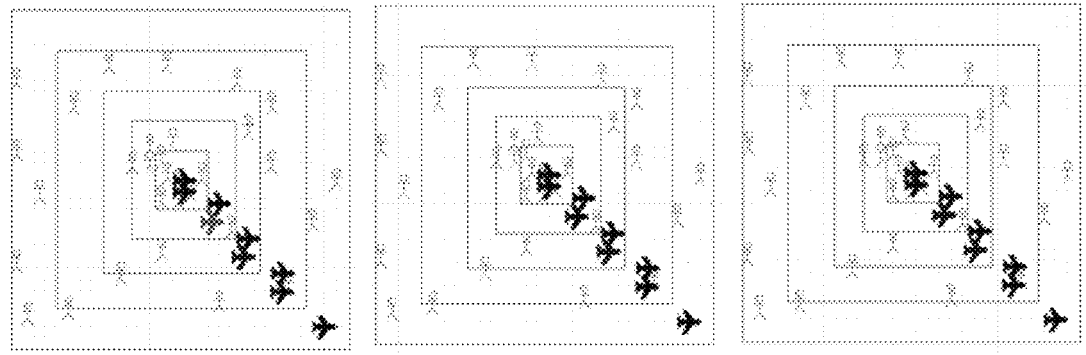
FIGS. 9(a)-9(c) diagrammatically represent another exemplary Layered Search and Rescue (LSAR) methodology for search and rescue according to one or more embodiments of the disclosed subject matter.

In the case more than one UAV 150 assigned for at least one of the layers L, such as shown in FIG. 9(a), the UAVs 150 may generally operate the same as or similar to the initial searching as for when only one UAV 150 is initially assigned per layer L. When the central processor 110 receives a call (e.g., a helping call), the central processor 110 can change one of the UAVs 150 in the layer L associated with the call to the rescuer mode and leave the other UAV 150 in the searcher mode. Moreover, the SAR mission in the associated layer L can be interrupted for the transition of one of the UAVs 150 in the same layer to the rescuer mode. The foregoing operations can be carried out according to Algorithm 2 in FIG. 12, as an example.

The rescuer UAV 150 can rescue all survivors in the associated layer L according to locations recorded in the survivor list corresponding to the associated layer L. The rescuer UAV 150 can operate in the rescuer mode according to Algorithm 3, for instance. When the rescuer UAV 150 has rescued all survivors in the associated layer L, the rescuer UAV 150 can send a notification to the central processor 110 reporting that all survivors from the list of survivors in the associated layer L have been rescued.

When the central processor 110 receives the notification call coming from the rescuer UAV 150, the rescuer UAV 150 can transition back to the searcher mode, if no additional survivors are needed to be rescued in the associated layer L, the central processor 110 can reassign the UAVs 150 in the "clear" layer L to the same or different layers L outward of the clear layer L.

Figure 10:
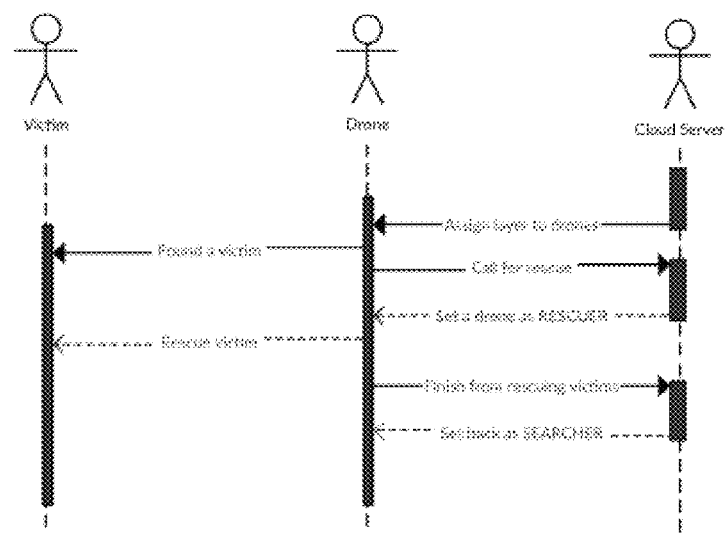
FIG. 10 shows an exemplary LSAR sequence diagram according to one or more embodiments of the disclosed subject matter.

FIG. 10 shows an exemplary sequence diagram for search and rescue operations between the UAV 150, the central processor 110, and a survivor (or victim) according to one or more embodiments of the disclosed subject matter. Respective portions of the sequence can be performed using algorithms specifically configuring respective processors according to embodiments of the disclosed subject matter, such as Algorithm 1, Algorithm 2, and Algorithm 3.

The sequence can include the assignment of UAVs 150 to the layers L using the central processor 110, for instance, according to Algorithm 2. As noted above, such assignment can be based on the number of layers L and UAVs 150 and may include a one-for-one assignment of UAVs 150 to layers L or more than one UAV 150 to at least one of the layers L.

The search UAVs 150 may find survivors (or victims, including deceased) in their respective assigned layers L. When the UAV 150 reaches a predetermined number of survivors in the assigned layer L, the UAV 150 can send a call signal (e.g., rescue call signal) to the central processor 110. Such operations of the UAVs 150 can be according to Algorithm 3, for instance.

The central processor 110 can set a UAV 150 associated with call signal to the rescuer mode, and the UAV 150 can rescue all survivors in the layer L (initially assigned or moved inward layer) and send a call signal to the central processor 110 that all of the survivors have been rescued. The central processor 110 can control transition of the rescue UAV 150 back to the searcher mode. Such operations can be according to Algorithm 2 and Algorithm 3, performed by the central processor 110 and the UAVs 150, respectively.

Embodiments of the disclosed subject matter may also be as set forth according to the parentheticals in the following paragraphs.

(1) A Layered Search and Rescue (LSAR) method implemented by a cloud server and a team of autonomous Unmanned Aerial Vehicles (UAVs) communicatively connected to each other via the cloud server to perform a search and rescue mission, the LSAR method comprising: providing the Unmanned Aerial Vehicles, each of the Unmanned Aerial Vehicles having processing circuitry, memory, and multi-modal sensors operatively connected to the processing circuitry; receiving, at the cloud server, data corresponding to a center of an area corresponding to an adverse/disaster event potentially having survivors at unknown locations in the area, said receiving being based on an emergency call from the area; unifying, using the cloud server, a standard unit for a region of the area corresponding to a smallest location unit; performing, using the cloud server, a partitioning operation of dividing the area into a set of incremental, numbered box-shaped layers based on coordinates defining perimeter portions of the area and coordinates of the center of the area; calculating, using the cloud server, a thickness of the box-shaped layers on a basis of the standard unit and based on a determination of a total number of the Unmanned Aerial Vehicles of the team; assigning, using the cloud server, a unique set of one or more of the Unmanned Aerial Vehicles to the box-shaped layers based on the calculated thicknesses and the determined total number of Unmanned Aerial Vehicles of the team; and controlling, using the cloud server and the Unmanned Aerial Vehicles, the Unmanned Aerial Vehicles to perform the search and rescue mission in the area, wherein said controlling includes switching of one or more of the Unmanned Aerial Vehicles between a searcher mode and a rescuer mode according to the following: when the unique set of one or more of the Unmanned Aerial Vehicles assigned to the box-shaped layers includes only one of the Unmanned Aerial Vehicles per box-shaped layer the method further comprises: setting all of the Unmanned Aerial Vehicles to the searcher mode to search for survivors in the respectively assigned box-shaped layers, making a helping call to the cloud server, by a first Unmanned Aerial Vehicle of the Unmanned Aerial Vehicles, based on found survivor information in a currently assigned box-shaped layer of the box-shaped layers for said first Unmanned Aerial Vehicle, and responsive to said making the helping call, controlling all Unmanned Aerial Vehicles in assigned box-shaped layers radially outward of the currently assigned box-shaped layer of said first Unmanned Aerial Vehicle to undergo radially inward shifts to respective immediately adjacent box-shaped layers, wherein said controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to the rescuer mode, and controlling all other Unmanned Aerial Vehicles radially outward of said second Unmanned Aerial Vehicle to remain in the searcher mode, and when the unique set of one or more of the Unmanned Aerial Vehicles assigned to the box-shaped layers includes more than one Unmanned Aerial Vehicle per box-shaped layer the method further comprises: setting all of the Unmanned Aerial Vehicles to the searcher mode to search for survivors in the respectively assigned box-shaped layers, making the helping call to the cloud server, by the first Unmanned Aerial Vehicle of the Unmanned Aerial Vehicles, based on the found survivor information in the currently assigned box-shaped layer, and responsive to said making the helping call, controlling another Unmanned Aerial Vehicle in the currently assigned box-shaped layer, which is the same as for said first Unmanned Aerial Vehicle, to switch from the searcher mode to the rescuer mode while controlling said first Unmanned Aerial Vehicle to remain in the searcher mode.

(2) The LSAR method of (1), wherein one or more of the box-shaped layers at or adjacent to the center of the area are assigned a greater number of Unmanned Aerial Vehicles of the team in comparison to at least an outer-most one of the box-shaped layers.

(3) The LSAR method of (1) or (2), wherein when said second Unmanned Aerial Vehicle has switched to the rescuer mode and rescued all survivors in the currently assigned box-shaped layer of said first Unmanned Aerial Vehicle, the method further comprises: switching said second Unmanned Aerial Vehicle to the searcher mode; and controlling all Unmanned Aerial Vehicles from said currently assigned box-shaped layer of the first and second Unmanned Aerial Vehicles and outward to move to respective originally assigned box-shaped layers.

(4) The LSAR method of any one of (1) to (3), wherein when said another Unmanned Aerial Vehicle has switched to the rescuer mode and rescued all survivors in the currently assigned box-shaped layer of said first Unmanned Aerial Vehicle, the method further comprises: switching said another Unmanned Aerial Vehicle to the searcher mode; and reassigning said first Unmanned Aerial Vehicle and said another Unmanned Aerial Vehicle to a same box-shaped layer or different box-shaped layers radially outward of the currently assigned box-shaped layer.

(5) The LSAR method of any one of (1) to (4), wherein in the searcher mode each said Unmanned Aerial Vehicle is configured to record locations of identified survivors.

(6) The LSAR method of any one of (1) to (5), wherein when a survivor is found by any one of the Unmanned Aerial Vehicles in the searcher mode, said one Unmanned Aerial Vehicle adds latitude and longitude of the found survivor to a list of survivors associated with the current box-shaped layer of said one Unmanned Aerial Vehicle.

(7) The LSAR method of any one of (1) to (6), wherein said controlling all Unmanned Aerial Vehicles in assigned box-shaped layers radially outward of the currently assigned box-shaped layer of said first Unmanned Aerial Vehicle to undergo radially inward shifts to respective immediately adjacent box-shaped layers involves interrupting respective search missions of said all Unmanned Aerial Vehicles in assigned box-shaped layers radially outward of the currently assigned box-shaped layer of said first Unmanned Aerial Vehicle.

(8) A distributed system configured to perform a search and rescue mission according to a Layered Search and Rescue (LSAR) methodology, the distributed system comprising: a remote server having a first processor; and a plurality of Unmanned Aerial Vehicles (UAVs) communicatively connected to each other via the remote server to perform the search and rescue mission, each of the Unmanned Aerial Vehicles having a second processor, memory, and sensors operatively connected to the second processor, wherein the remote server is configured to: receive data corresponding to a center of an area corresponding to an adverse/disaster event potentially having survivors at unknown locations in the area, perform a partitioning operation of dividing the area into a set of incremental, numbered box-shaped layers based on coordinates defining perimeter portions of the area and coordinates of the center of the area, calculate a thickness of the box-shaped layers based on a determination of a total number of available Unmanned Aerial Vehicles of the plurality of Unmanned Aerial Vehicles, assign one or more of the available Unmanned Aerial Vehicles to each box-shaped layer based on the calculated thickness and the determined total number of available Unmanned Aerial Vehicles, and control the available Unmanned Aerial Vehicles to perform the search and rescue mission in the area, wherein the remote server is configured to perform the following operations when the one or more available Unmanned Aerial Vehicles assigned to each box-shaped layer includes only one of the Unmanned Aerial Vehicles per box-shaped layer: set all of the available Unmanned Aerial Vehicles to a searcher mode to search for survivors in the respectively assigned box-shaped layers, and responsive to receipt of a helping call from a first Unmanned Aerial Vehicle of the available Unmanned Aerial Vehicles, control all available Unmanned Aerial Vehicles in assigned box-shaped layers radially outward of a currently assigned box-shaped layer of said first Unmanned Aerial Vehicle to undergo radially inward shifts to respective immediately adjacent box-shaped layers, wherein the controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to a rescuer mode, and controlling all other Unmanned Aerial Vehicles radially outward of said second Unmanned Aerial Vehicle to remain in the searcher mode, and wherein the remote server is configured to perform the following operations when the one or more available Unmanned Aerial Vehicles assigned to each box-shaped layer includes more than one Unmanned Aerial Vehicle per box-shaped layer: set all of the available Unmanned Aerial Vehicles to the searcher mode to search for survivors in the respectively assigned box-shaped layers, and responsive to receipt of the helping call from the first Unmanned Aerial Vehicle of the available Unmanned Aerial Vehicles, control another Unmanned Aerial Vehicle in the currently assigned box-shaped layer, which is the same as for said first Unmanned Aerial Vehicle, to switch from the searcher mode to the rescuer mode while said first Unmanned Aerial Vehicle remains in the searcher mode.

(9) The distributed system of (8), wherein at least an outer-most one of said box-shaped layers has less Unmanned Aerial Vehicles than one or more of the box-shaped layers between the center and the area and the outer-most one box-shaped layer.

(10) The distributed system of (8) or (9), wherein the remote server is configured to perform the following operations when said second Unmanned Aerial Vehicle has switched to the rescuer mode and rescued all survivors in the currently assigned box-shaped layer of said first Unmanned Aerial Vehicle: switch said second Unmanned Aerial Vehicle to the searcher mode, and control all Unmanned Aerial Vehicles from said currently assigned box-shaped layer of the first and second Unmanned Aerial Vehicles and outward to move to respective originally assigned box-shaped layers.

(11) The distributed system of any one of (8) to (10), wherein the remote server is configured to perform the following operations when said another Unmanned Aerial Vehicle has switched to the rescuer mode and rescued all survivors in the currently assigned box-shaped layer of said first Unmanned Aerial Vehicle: switch said another Unmanned Aerial Vehicle to the searcher mode, and reassign said first Unmanned Aerial Vehicle and said another Unmanned Aerial Vehicle to a same box-shaped layer or different box-shaped layers radially outward of said currently assigned box-shaped layer.

(12) The distributed system of any one of (8) to (11), wherein in the searcher mode each said Unmanned Aerial Vehicle is configured to identify locations of survivors and record locations of the identified survivors.

(13) The distributed system of any one of (8) to (12), wherein each of the Unmanned Aerial Vehicles is configured to find a survivor, identify a location of the found survivor, and add latitude and longitude information for the found survivor to a list of survivors stored by the remote server associated with the current box-shaped layer of the Unmanned Aerial Vehicle.

(14) The distributed system of any one of (8) to (13), wherein the remote server is configured to interrupt respective search missions of all Unmanned Aerial Vehicles in assigned box-shaped layers radially outward of the currently assigned box-shaped layer of said first Unmanned Aerial Vehicle, and resume the interrupted search missions based on a list of survivors associated with the current box-shaped layer of the Unmanned Aerial Vehicle.

(15) A non-transitory computer-readable storage medium storing computer-readable instructions that, when executed by one or more computers, cause the one or more computers to perform a Layered Search and Rescue (LSAR) method using a plurality of Unmanned Aerial Vehicles (UAVs), the LSAR method comprising: receiving data corresponding to a center of an area corresponding to an adverse/disaster event potentially having survivors at unknown locations in the area, said receiving being based on an emergency call from the area; performing a partitioning operation of dividing the area into a set of incremental, numbered box-shaped layers based on coordinates defining perimeter portions of the area and coordinates of the center of the area; calculating a thickness of the box-shaped layers based on a standard unit and a total number of the Unmanned Aerial Vehicles; exclusively assigning one or more of the Unmanned Aerial Vehicles to each box-shaped layer based on the total number of Unmanned Aerial Vehicles; and controlling the Unmanned Aerial Vehicles to perform a search and rescue mission in the area by selectively switching one or more of the Unmanned Aerial Vehicles between a searcher mode and a rescuer mode, said controlling including initializing all of the Unmanned Aerial Vehicles to the searcher mode to search for survivors in the respectively assigned box-shaped layers, wherein in the searcher mode each said Unmanned Aerial Vehicles is controlled to identify survivors and record locations of the identified survivors.

(16) The non-transitory computer-readable storage medium of (15), wherein when the one or more Unmanned Aerial Vehicles assigned to each box-shaped layer includes only one of the Unmanned Aerial Vehicles per box-shaped layer the method further comprises: receiving a helping call from a first Unmanned Aerial Vehicle of the Unmanned Aerial Vehicles, based on found survivor information in a currently assigned box-shaped layer of the box-shaped layers, and responsive to said receiving the helping call, controlling all Unmanned Aerial Vehicles in assigned box-shaped layers radially outward of the currently assigned box-shaped layer of said first Unmanned Aerial Vehicle to undergo an inward shift to respective immediately adjacent box-shaped layers, wherein said controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle to switch from the searcher mode to the rescuer mode, and controlling all other Unmanned Aerial Vehicles radially outward of said second Unmanned Aerial Vehicle to remain in the searcher mode, and wherein when the one or more Unmanned Aerial Vehicles assigned to each box-shaped layer includes more than one Unmanned Aerial Vehicle per box-shaped layer the method further comprises: setting all of the Unmanned Aerial Vehicles to the searcher mode to search for survivors in the respectively assigned box-shaped layers, receiving the helping call from the first Unmanned Aerial Vehicle of the Unmanned Aerial Vehicles based on the found survivor information in the currently assigned box-shaped layer of the box-shaped layers, and responsive to said receiving the helping call, controlling another Unmanned Aerial Vehicle in the currently assigned box-shaped layer, which is the same as for said first Unmanned Aerial Vehicle, to switch from the searcher mode to the rescuer mode while controlling said first Unmanned Aerial Vehicle to remain in the searcher mode.

(17) The non-transitory computer-readable storage medium of (15) or (16), wherein responsive to said second Unmanned Aerial Vehicle rescuing all survivors in the currently assigned box-shaped layer of said first Unmanned Aerial Vehicle, the method further comprises: switching said second Unmanned Aerial Vehicle to the searcher mode; and controlling all Unmanned Aerial Vehicles from said currently assigned box-shaped layer of the first and second Unmanned Aerial Vehicles and outward to move to respective originally assigned box-shaped layers.

(18) The non-transitory computer-readable storage medium of any one of (15) to (17), wherein responsive to said another Unmanned Aerial Vehicle rescuing all survivors in the currently assigned box-shaped layer of said first Unmanned Aerial Vehicle, the method further comprises: switching said another Unmanned Aerial Vehicle to the searcher mode; and reassigning said first Unmanned Aerial Vehicle and said another Unmanned Aerial Vehicle to a same box-shaped layer or different box-shaped layers radially outward of said currently assigned box-shaped layer.

(19) The non-transitory computer-readable storage medium of any one of (15) to (18), wherein said controlling all Unmanned Aerial Vehicles in assigned box-shaped layers radially outward of the currently assigned box-shaped layer of said first Unmanned Aerial Vehicle to undergo inward shifts to respective immediately adjacent box-shaped layers involves interrupting respective search missions of said all Unmanned Aerial Vehicles.

(20) The non-transitory computer-readable storage medium of any one of (15) to (19), wherein one or more of the box-shaped layers at or closer to the center of the area than an outer-most one of the box-shaped layers are assigned a greater number of Unmanned Aerial Vehicles than the outer-most box-shaped layer.

Having now described embodiments of the disclosed subject matter, it should be apparent to those skilled in the art that the foregoing is merely illustrative and not limiting, having been presented by way of example only. Thus, although particular configurations have been discussed and illustrated herein, other configurations can be and are also employed. Further, numerous modifications and other embodiments (e.g., combinations, rearrangements, etc.) are enabled by the present disclosure and are contemplated as falling within the scope of the disclosed subject matter and any equivalents thereto. Features of the disclosed embodiments can be combined, rearranged, omitted, etc., within the scope of described subject matter to produce additional embodiments. Furthermore, certain features may sometimes be used to advantage without a corresponding use of other features. Accordingly, Applicant intends to embrace all such alternatives, modifications, equivalents, and variations that are within the spirit and scope of the present disclosure. Further, it is therefore to be understood that within the scope of the appended claims, the disclosure may be practiced otherwise than as specifically described herein.

The invention claimed is:

1. A Layered Search and Rescue (LSAR) method implemented by a cloud server and a team of autonomous Unmanned Aerial Vehicles (UAVs) communicatively connected to each other via the cloud server to perform a search and rescue mission, the LSAR method comprising:
providing the Unmanned Aerial Vehicles, each of the Unmanned Aerial Vehicles having processing circuitry, memory, and multi-modal sensors operatively connected to the processing circuitry;
receiving, at the cloud server, data corresponding to a center and a perimeter of an area corresponding to an adverse/disaster event potentially having survivors at unknown locations in the area, said receiving being based on an emergency call from the area;
setting, using the cloud server, a standard unit, each standard unit representing a region of the area corresponding to a smallest location unit;
overlaying, using the cloud server, a matrix on a map of the area, the matrix having a same center as the area and including the perimeter of the area, each division of the matrix equal to the standard unit;
performing, using the cloud server, a partitioning operation of dividing the matrix into a set of incremental, numbered box-shaped layers, each box-shaped layer concentric with the center of the area;

calculating, using the cloud server, a thickness of a separation between adjacent box-shaped layers on a basis of the standard unit and based on a determination of a total number of the Unmanned Aerial Vehicles of the team, such that the thickness is calculated by dividing half a width of the matrix by the total number of Unmanned Aerial Vehicles, wherein a first layer closest to the center has a double thickness, and each other layer is separated by the thickness;

assigning, using the cloud server, a unique set of one or more of the Unmanned Aerial Vehicles to the box-shaped layers based on the calculated thicknesses and the determined total number of Unmanned Aerial Vehicles of the team, wherein the Unmanned Aerial Vehicles are assigned to the layers from the first layer to an outer-most layer, the assignment repeating until all of the Unmanned Aerial Vehicles have been assigned; and controlling, using the cloud server and the Unmanned Aerial Vehicles, the Unmanned Aerial Vehicles to perform the search and rescue mission in the area, wherein said controlling includes switching of one or more of the Unmanned Aerial Vehicles between a searcher mode and a rescuer mode according to the following:

when the unique set of one or more of the Unmanned Aerial Vehicles assigned to the box-shaped layers includes only one of the Unmanned Aerial Vehicles per box-shaped layer the method further comprises:

setting all of the Unmanned Aerial Vehicles to the searcher mode to search for survivors in the respectively assigned box-shaped layers, making a helping call to the cloud server, by a first Unmanned Aerial Vehicle of the Unmanned Aerial Vehicles, based on found survivor information in a currently assigned box-shaped layer of the box-shaped layers for said first Unmanned Aerial Vehicle, and responsive to said making the helping call, controlling all Unmanned Aerial Vehicles in assigned box-shaped layers radially outward of the currently assigned box-shaped layer of said first Unmanned Aerial Vehicle to undergo radially inward shifts to respective immediately adjacent box-shaped layers, wherein said controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to the rescuer mode, and controlling all other Unmanned Aerial Vehicles radially outward of said second Unmanned Aerial Vehicle to remain in the searcher mode, and when the unique set of one or more of the Unmanned Aerial Vehicles assigned to the box-shaped layers includes more than one Unmanned Aerial Vehicle per box-shaped layer the method further comprises:

setting all of the Unmanned Aerial Vehicles to the searcher mode to search for survivors in the respectively assigned box-shaped layers, making the helping call to the cloud server, by the first Unmanned Aerial Vehicle of the Unmanned Aerial Vehicles, based on the found survivor information in the currently assigned box-shaped layer, and responsive to said making the helping call, controlling another Unmanned Aerial Vehicle in the currently assigned box-shaped layer, which is the same as for said first Unmanned Aerial Vehicle, to switch from the searcher mode to the rescuer mode while controlling said first Unmanned Aerial Vehicle to remain in the searcher mode.

2. The LSAR method of claim 1, wherein one or more of the box-shaped layers at or adjacent to the center of the area are assigned a greater number of Unmanned Aerial Vehicles of the team in comparison to at least an outer-most one of the box-shaped layers.

3. The LSAR method of claim 1, wherein when said second Unmanned Aerial Vehicle has switched to the rescuer mode and rescued all survivors in the currently assigned box-shaped layer of said first Unmanned Aerial Vehicle, the method further comprises:

switching said second Unmanned Aerial Vehicle to the searcher mode; and controlling all Unmanned Aerial Vehicles from said currently assigned box-shaped layer of the first and second Unmanned Aerial Vehicles and outward to move to respective originally assigned box-shaped layers.

4. The LSAR method of claim 1, wherein when said another Unmanned Aerial Vehicle has switched to the rescuer mode and rescued all survivors in the currently assigned box-shaped layer of said first Unmanned Aerial Vehicle, the method further comprises:

switching said another Unmanned Aerial Vehicle to the searcher mode; and reassigning said first Unmanned Aerial Vehicle and said another Unmanned Aerial Vehicle to a same box-shaped layer or an adjacent box-shaped layer radially outward of the currently assigned box-shaped layer.

5. The LSAR method of claim 1, wherein in the searcher mode each said Unmanned Aerial Vehicle is configured to record locations of identified survivors.

6. The LSAR method of claim 1, wherein when a survivor is found by any one of the Unmanned Aerial Vehicles in the searcher mode, said one Unmanned Aerial Vehicle adds latitude and longitude of the found survivor to a list of survivors associated with the currently assigned box-shaped layer of said one Unmanned Aerial Vehicle.

7. The LSAR method of claim 1, wherein said controlling all Unmanned Aerial Vehicles in assigned box-shaped layers radially outward of the currently assigned box-shaped layer of said first Unmanned Aerial Vehicle to undergo radially inward shifts to respective immediately adjacent box-shaped layers involves interrupting respective search missions of said all Unmanned Aerial Vehicles in assigned box-shaped layers radially outward of the currently assigned box-shaped layer of said first Unmanned Aerial Vehicle.

8. A distributed system configured to perform a search and rescue mission according to a Layered Search and Rescue (LSAR) methodology, the distributed system comprising:

a remote server having a first processor; and a plurality of Unmanned Aerial Vehicles (UAVs) communicatively connected to each other via the remote server to perform the search and rescue mission, each of the Unmanned Aerial Vehicles having a second processor, memory, and sensors operatively connected to the second processor, wherein the remote server is configured to:

receive data corresponding to a center and a perimeter of an area corresponding to an adverse/disaster event potentially having survivors at unknown locations in the area, set a standard unit configured to represent a region of the area corresponding to a smallest location unit;

overlay a matrix on a map of the area, the matrix having a same center as the area and including the perimeter of the area, each division of the matrix equal to the standard unit;

perform a partitioning operation of dividing the matrix into a set of incremental, numbered box-shaped layers, each box-shaped layer concentric with the center of the area;

calculate a thickness of a separation between adjacent box-shaped layers based on a determination of a total number of available Unmanned Aerial Vehicles of the plurality of Unmanned Aerial Vehicles, such that the thickness is calculated by dividing half a width of the matrix by the total number of Unmanned Aerial Vehicles, wherein a first layer closest to the center has a double thickness, and each other layer is separated by the thickness;

assign one or more of the available Unmanned Aerial Vehicles to each box-shaped layer based on the calculated thickness and the determined total number of available Unmanned Aerial Vehicles, wherein the Unmanned Aerial Vehicles are assigned to the layers from the first layer to an outer-most layer, the assignment repeating until all of the Unmanned Aerial Vehicles have been assigned; and control the available Unmanned Aerial Vehicles to perform the search and rescue mission in the area, wherein the remote server is configured to perform the following operations when the one or more available Unmanned Aerial Vehicles assigned to each box-shaped layer includes only one of the Unmanned Aerial Vehicles per box-shaped layer:

set all of the available Unmanned Aerial Vehicles to a searcher mode to search for survivors in the respectively assigned box-shaped layers, and responsive to receipt of a helping call from a first Unmanned Aerial Vehicle of the available Unmanned Aerial Vehicles, control all available Unmanned Aerial Vehicles in assigned box-shaped layers radially outward of a currently assigned box-shaped layer of said first Unmanned Aerial Vehicle to undergo radially inward shifts to respective immediately adjacent box-shaped layers, wherein the controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle, switching said second Unmanned Aerial Vehicle from the searcher mode to a rescuer mode, and controlling all other Unmanned Aerial Vehicles radially outward of said second Unmanned Aerial Vehicle to remain in the searcher mode, and wherein the remote server is configured to perform the following operations when the one or more available Unmanned Aerial Vehicles assigned to each box-shaped layer includes more than one Unmanned Aerial Vehicle per box-shaped layer:

set all of the available Unmanned Aerial Vehicles to the searcher mode to search for survivors in the respectively assigned box-shaped layers, and responsive to receipt of the helping call from the first Unmanned Aerial Vehicle of the available Unmanned Aerial Vehicles, control another Unmanned Aerial Vehicle in the currently assigned box-shaped layer, which is the same as for said first Unmanned Aerial Vehicle, to switch from the searcher mode to the rescuer mode while said first Unmanned Aerial Vehicle remains in the searcher mode.

9. The distributed system of claim 8, wherein at least an outer-most one of said box-shaped layers has fewer Unmanned Aerial Vehicles than one or more of the box-shaped layers between the center and the area and the outer-most one box-shaped layer.

10. The distributed system of claim 8, wherein the remote server is configured to perform the following operations when said second Unmanned Aerial Vehicle has switched to the rescuer mode and rescued all survivors in the currently assigned box-shaped layer of said first Unmanned Aerial Vehicle:

switch said second Unmanned Aerial Vehicle to the searcher mode, and control all Unmanned Aerial Vehicles from said currently assigned box-shaped layer of the first and second Unmanned Aerial Vehicles and outward to move to respective originally assigned box-shaped layers.

11. The distributed system of claim 8, wherein the remote server is configured to perform the following operations when said another Unmanned Aerial Vehicle has switched to the rescuer mode and rescued all survivors in the currently assigned box-shaped layer of said first Unmanned Aerial Vehicle:

switch said another Unmanned Aerial Vehicle to the searcher mode, and reassign said first Unmanned Aerial Vehicle and said another Unmanned Aerial Vehicle to a same box-shaped layer or different box-shaped layers radially outward of said currently assigned box-shaped layer.

12. The distributed system of claim 8, wherein in the searcher mode each said Unmanned Aerial Vehicle is configured to identify locations of survivors and record locations of the identified survivors.

13. The distributed system of claim 8, wherein each of the Unmanned Aerial Vehicles is configured to find a survivor, identify a location of the found survivor, and add latitude and longitude information for the found survivor to a list of survivors stored by the remote server associated with the currently assigned box-shaped layer of the Unmanned Aerial Vehicle.

14. The distributed system of claim 8, wherein the remote server is configured to interrupt respective search missions of all Unmanned Aerial Vehicles in assigned box-shaped layers radially outward of the currently assigned box-shaped layer of said first Unmanned Aerial Vehicle, and resume the interrupted search missions based on a list of survivors associated with the currently assigned box-shaped layer of the Unmanned Aerial Vehicle.

15. A non-transitory computer-readable storage medium storing computer-readable instructions that, when executed by one or more computers, cause the one or more computers to perform a Layered Search and Rescue (LSAR) method using a plurality of Unmanned Aerial Vehicles (UAVs), the LSAR method comprising:

receiving data corresponding to a center of an area and a perimeter corresponding to an adverse/disaster event potentially having survivors at unknown locations in the area, said receiving being based on an emergency call from the area;

setting a standard unit, each standard unit representing a region of the area corresponding to a smallest location unit;

overlaying a matrix on a map of the area, the matrix having a same center as the area and including the perimeter of the area, each division of the matrix equal to the standard unit;

performing a partitioning operation of dividing the matrix into a set of incremental, numbered box-shaped layers, each box-shaped layer concentric with the center of the area;

calculating a thickness of a separation between adjacent box-shaped layers based on a standard unit and a total number of the Unmanned Aerial Vehicles, wherein a first layer closest to the center has a double thickness, and each other layer is separated by the thickness;

exclusively assigning one or more of the Unmanned Aerial Vehicles to each box-shaped layer based on the total number of Unmanned Aerial Vehicles, wherein the Unmanned Aerial Vehicles are assigned to the layers from the first layer to an outer-most layer, the assignment repeating until all of the Unmanned Aerial Vehicles have been assigned; and controlling the Unmanned Aerial Vehicles to perform a search and rescue mission in the area by selectively switching one or more of the Unmanned Aerial Vehicles between a searcher mode and a rescuer mode, said controlling including initializing all of the Unmanned Aerial Vehicles to the searcher mode to search for survivors in the respectively assigned box-shaped layers, wherein in the searcher mode each said Unmanned Aerial Vehicles is controlled to identify survivors and record locations of the identified survivors.

16. The non-transitory computer-readable storage medium of claim 15, wherein when the one or more Unmanned Aerial Vehicles assigned to each box-shaped layer includes only one of the Unmanned Aerial Vehicles per box-shaped layer the method further comprises:

receiving a helping call from a first Unmanned Aerial Vehicle of the Unmanned Aerial Vehicles, based on found survivor information in a currently assigned box-shaped layer of the box-shaped layers, and responsive to said receiving the helping call, controlling all Unmanned Aerial Vehicles in assigned box-shaped layers radially outward of the currently assigned box-shaped layer of said first Unmanned Aerial Vehicle to undergo an inward shift to respective immediately adjacent box-shaped layers, wherein said controlling includes: controlling a second Unmanned Aerial Vehicle of the Unmanned Aerial Vehicles previously in the box-shaped layer immediately adjacent to the currently assigned box-shaped layer of said first Unmanned Aerial Vehicle to move to the currently assigned box-shaped layer of said first Unmanned Aerial Vehicle to switch from the searcher mode to the rescuer mode, and controlling all other Unmanned Aerial Vehicles radially outward of said second Unmanned Aerial Vehicle to remain in the searcher mode, and wherein when the one or more Unmanned Aerial Vehicles assigned to each box-shaped layer includes more than one Unmanned Aerial Vehicle per box-shaped layer the method further comprises:

setting all of the Unmanned Aerial Vehicles to the searcher mode to search for survivors in the respectively assigned box-shaped layers, receiving the helping call from the first Unmanned Aerial Vehicle of the Unmanned Aerial Vehicles based on the found survivor information in the currently assigned box-shaped layer of the box-shaped layers, and responsive to said receiving the helping call, controlling another Unmanned Aerial Vehicle in the currently assigned box-shaped layer, which is the same as for said first Unmanned Aerial Vehicle, to switch from the searcher mode to the rescuer mode while controlling said first Unmanned Aerial Vehicle to remain in the searcher mode.

17. The non-transitory computer-readable storage medium of claim 15, wherein responsive to said second Unmanned Aerial Vehicle rescuing all survivors in the currently assigned box-shaped layer of said first Unmanned Aerial Vehicle, the method further comprises:

switching said second Unmanned Aerial Vehicle to the searcher mode; and controlling all Unmanned Aerial Vehicles from said currently assigned box-shaped layer of the first and second Unmanned Aerial Vehicles and outward to move to respective originally assigned box-shaped layers.

18. The non-transitory computer-readable storage medium of claim 15, wherein responsive to said another Unmanned Aerial Vehicle rescuing all survivors in the currently assigned box-shaped layer of said first Unmanned Aerial Vehicle, the method further comprises:

switching said another Unmanned Aerial Vehicle to the searcher mode; and reassigning said first Unmanned Aerial Vehicle and said another Unmanned Aerial Vehicle to a same box-shaped layer or an adjacent box-shaped layer radially outward of said currently assigned box-shaped layer.

19. The non-transitory computer-readable storage medium of claim 15, wherein said controlling all Unmanned Aerial Vehicles in assigned box-shaped layers radially outward of the currently assigned box-shaped layer of said first Unmanned Aerial Vehicle to undergo inward shifts to respective immediately adjacent box-shaped layers involves interrupting respective search missions of said all Unmanned Aerial Vehicles in the assigned box-shaped layers radially outward of the currently assigned box-shaped layer.

20. The non-transitory computer-readable storage medium of claim 15, wherein one or more of the box-shaped layers at or closer to the center of the area than an outer-most one of the box-shaped layers are assigned a greater number of Unmanned Aerial Vehicles than the outer-most box-shaped layer.

* * * * *